(No Model.)
J. POWELL.
DEVICE FOR PREVENTING THE LOOSENING OF NUTS.
No. 397,935. Patented Feb. 19, 1889.
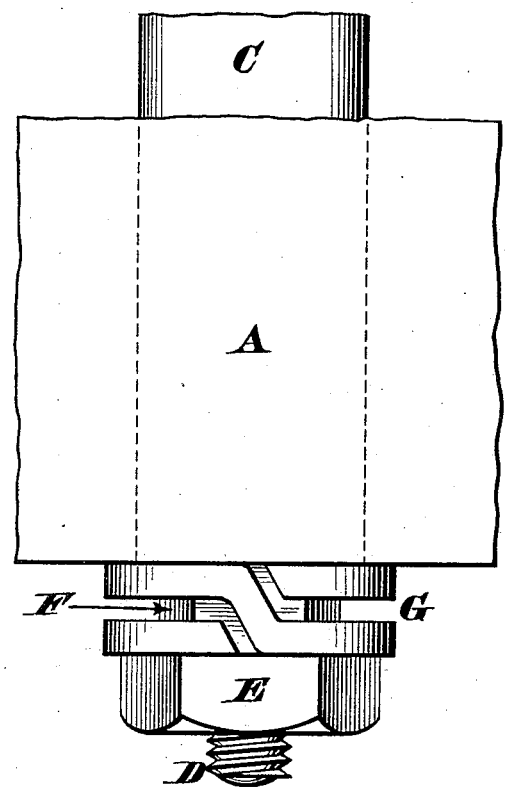
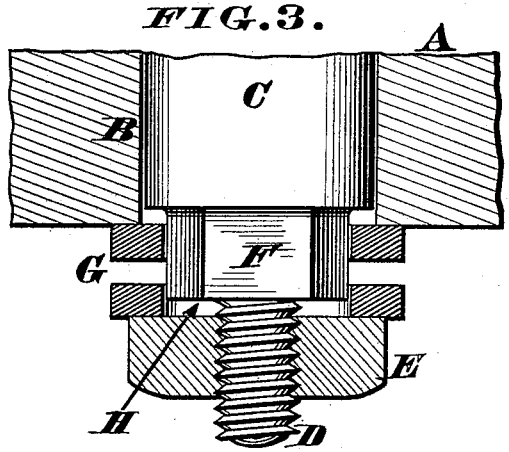
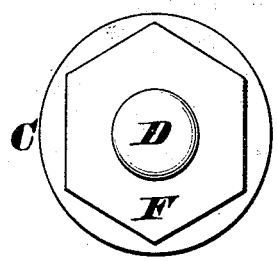
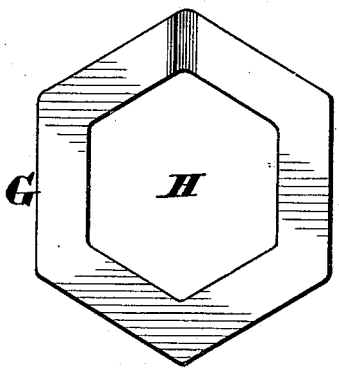
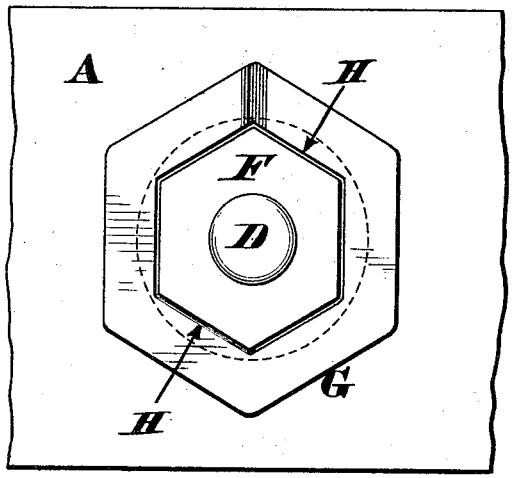
Attest.
Paul Carpenter
S. S. Carpenter
Inventor.
James Powell
by James H. Layman
Atty.

UNITED STATES PATENT OFFICE.

JAMES POWELL, OF CINCINNATI, OHIO.

DEVICE FOR PREVENTING THE LOOSENING OF NUTS.

SPECIFICATION forming part of Letters Patent No. 397,935, dated February 19, 1889.

Application filed September 27, 1888. Serial No. 286,551. (No model.)

*To all whom it may concern:*

Be it known that I, JAMES POWELL, a citizen of the United States of America, residing at Cincinnati, in the county of Hamilton and State of Ohio, have invented certain new and useful Improvements in Spring-Washers, of which the following is a specification, reference being had therein to the accompanying drawings.

My invention comprises a novel combination of shaft, washer, and nut, which devices permit a free turning of the shaft within its bearings, together with a limited end-play or adjustment of the same, without causing the nut to work loose. This result is accomplished by providing the extreme end of the shaft with a screw-threaded stem wherewith an ordinary nut is engaged, a square, hexagonal, or other non-circular shank being located between the inner end of said stem and said shaft. The stem and shank are usually integral with the shaft, and the washer, which consists of a split spring-ring, has an eye or central opening that fits snugly around said shank in order that any turning of the shaft will cause a corresponding turning of said spring-washer, and thus prevent the nut working loose, while at the same time said washer can be adjusted when necessary, as hereinafter more fully described.

In the annexed drawings, Figure 1 is an elevation of a shaft provided with my improved spring-ring washer. Fig. 2 is a plan of the same, the nut being disengaged from the screw-threaded stem and the shaft being indicated by a dotted circular line. Fig. 3 is an axial section of the nut, spring-ring washer, and bearing, the shaft and its shank and stem being shown in elevation. Fig. 4 is an end view of the shaft. Fig. 5 is a plan of the spring-ring washer. Fig. 6 is a side elevation of the same.

A represents a bearing, casing, or housing of any kind, and B is a bore, seat, or socket of the same, which bore has journaled within it a shaft, spindle, mandrel, or other revolving member, C, of any desired size, shape, and diameter, the extreme end of said member C terminating with a screw-threaded stem, D, wherewith an ordinary nut, E, is engaged. Located between the inner end of this stem D and shaft C is a shank, F, of any desired length, but necessarily non-circular in transverse section, although it is here shown as being hexagonal. Furthermore, this stem and shank are preferably integral with the shaft, but in some cases they may be rigidly attached thereto.

G is the split spring-ring washer, composed of any suitable number of yielding coils and having an eye or central opening, H, of the same size and shape as the shank F, so as to fit snugly around the latter, as clearly seen in Fig. 2. While the eye of this washer must be of the same shape as the shank, the outer periphery of said washer may be of any desired form. As seen in Figs. 1 and 3, its outer edge is circular; but in the other illustrations this edge is hexagonal.

When the turning member C is fitted within the bearing B of housing A, the split spring-ring G serves as a yielding washer that retains said member in place with more or less of an elastic pressure, according to the adjustment of nut E, which nut may be loosened or tightened at will, and as the washer turns with the member C it is evident said nut can never work loose. Consequently this split spring-ring G serves the twofold purpose of a washer and a spring, thereby simplifying and cheapening the construction of those devices employed for taking up the end-play of shafts, &c. Finally, while showing and describing the washer as applied to a cylindrical shaft or spindle, it is to be distinctly understood that my invention is not limited to any specific form of turning member, as the latter may in some cases be conical, or any other desired shape that will permit it to revolve within a suitable socket or bearing.

I claim as my invention—

A shaft, spindle, or other revolving member, as C, journaled within a suitable bearing, as A B, and having a screw-threaded stem, D, and non-circular shank F, which shank is located between said shaft and stem, in combination with a nut, E, and split spring-ring washer G, which washer has a non-circular eye, H, engaged with said shank F, for the purpose of compelling said spring-washer G to turn in unison with said revolving member C, as herein described.

In testimony whereof I affix my signature in presence of two witnesses.

JAMES POWELL.

Witnesses:
JAMES H. LAYMAN,
FRANCIS B. JAMES.